United States Patent [19]

Silvus, Jr. et al.

[11] Patent Number: 5,473,245
[45] Date of Patent: Dec. 5, 1995

[54] MAGNETOSTRICTIVE LINEAR DISPLACEMENT TRANSMITTER HAVING IMPROVED PIEZOELECTRIC SENSOR

[75] Inventors: Howard S. Silvus, Jr.; Edward J. Miller, Jr., both of San Antonio, Tex.; J. Marion Matherne; Tony W. Harper, both of Baton Rouge, La.

[73] Assignee: K-Tek Corporation, Prairieville, La.

[21] Appl. No.: 147,028

[22] Filed: Nov. 4, 1993

[51] Int. Cl.⁶ .................... G01B 7/14; G01F 23/30; H03H 9/00
[52] U.S. Cl. .................... 324/207.13; 73/314; 310/333; 310/369; 324/207.24; 333/148
[58] Field of Search .................... 324/207.13, 207.22, 324/207.24; 310/333, 334, 369; 333/148; 367/159, 180; 73/313, 314

[56] References Cited

U.S. PATENT DOCUMENTS

| | | | |
|---|---|---|---|
| 2,334,593 | 11/1943 | Wyckoff | 175/183 |
| 2,474,693 | 6/1949 | Rowe | 175/183 |
| 2,838,696 | 6/1958 | Thurston | 310/369 X |
| 3,154,946 | 11/1964 | Ordorica et al. | 73/313 |
| 3,208,281 | 9/1965 | Kalmus et al. | 73/313 |
| 3,225,312 | 12/1965 | Tellerman | 331/157 |
| 3,286,190 | 11/1966 | Hare | 333/30 |
| 3,290,649 | 12/1966 | Whitehouse | 340/146.2 |
| 3,372,592 | 3/1968 | Gravert | 73/313 |
| 3,492,667 | 1/1970 | Gratian | 340/174 |
| 3,566,239 | 2/1971 | Taniguchi | 318/593 |
| 3,678,750 | 7/1972 | DiNoia et al. | 73/313 |
| 3,898,555 | 8/1975 | Tellerman | 324/34 |
| 3,982,144 | 9/1976 | Rogers et al. | 310/369 X |
| 4,006,637 | 2/1977 | Kinosita | 73/313 |
| 4,028,619 | 6/1977 | Edwards | 324/34 |
| 4,071,818 | 1/1978 | Krisst | 324/208 |
| 4,158,964 | 6/1979 | McCrea et al. | 73/290 |
| 4,238,844 | 12/1980 | Ueda et al. | 367/117 |
| 4,305,283 | 12/1981 | Redding | 73/290 |
| 4,344,068 | 8/1982 | Thompson et al. | 340/365 |
| 4,510,587 | 4/1985 | Schneider | 367/118 |
| 4,651,044 | 3/1987 | Kompanek | 310/369 X |
| 4,652,786 | 3/1987 | Mishiro | 310/369 X |
| 4,678,993 | 7/1987 | Vinnemann et al. | 324/208 |
| 4,709,210 | 11/1987 | Pond | 324/207 |
| 4,803,427 | 2/1989 | Mason et al. | 324/207 |
| 4,839,590 | 6/1989 | Koski et al. | 324/208 |
| 4,943,773 | 7/1990 | Koski et al. | 324/207 |
| 5,043,685 | 8/1991 | Nyce | 333/148 |
| 5,049,776 | 9/1991 | Ogawa | 310/333 |
| 5,070,485 | 12/1991 | Nyce | 367/127 |
| 5,196,791 | 3/1993 | Dumais | 324/207.13 |

OTHER PUBLICATIONS

MTS Systems, Corp., "MTS Level Plus Tank Gauging Systems for Small to Medium Tank Farms", Feb. 1994.

*Primary Examiner*—Gerard R. Strecker
*Attorney, Agent, or Firm*—Gunn, Lee & Miller

[57] ABSTRACT

An improved magnetostrictive wire based position transducer that has applications in both liquid level measuring systems and in position indicating systems. A cylindrically structured and circularly polarized piezoelectric element directly measures the torsional acoustic waves in the magnetostrictive wire as they are received by the sensor. The cylindrical structure of the sensor eliminates many of the inadvertently detected acoustic and electrical pulses within the wire that are not indicative of the passage of the torsional wave of concern. The present system provides an improved sensor configuration which is selectively sensitive to torsional waves while being insensitive to vibrations in alternate planes. This improved piezoelectric sensor in combination with the electrical configuration allows placement of the magnetostrictive wire apart from the liquid whose level is being measured or from the indicator whose position is of concern. The system provides a means for transmitting the liquid level within a container to a sensor column outside of the container in a manner that improves access, maintenance, calibration, and installation. In the preferred embodiment, each of the above improvements is provided in a system that incorporates an instrumentation loop powered microprocessor based transmitter with low current requirements and increased sensitivity.

10 Claims, 2 Drawing Sheets

MAGNETOSTRICTIVE LINEAR DISPLACEMENT TRANSMITTER HAVING IMPROVED PIEZOELECTRIC SENSOR

BACKGROUND OF THE INVENTION

1. Field of the Invention

The present invention relates generally to linear position transmitters that utilize linear magnetostrictive wire to communicate the position of a magnet displaceable along the wire. The invention relates more specifically to an improved linear position transducer incorporating a magnetostrictive wire within which a torsional strain is detected by an improved piezoelectric sensor element which may be placed in an improved offset housing configuration for the transmitter.

2. Description of the Prior Art

Many state of the art systems for measuring liquid levels in storage tanks, as well as systems for measuring linear displacements for machine tools and the like, utilize a movable permanent magnet float or position indicator that surrounds a linearly oriented magnetostrictive wire. The use of the electromagnetic phenomenon of magnetostriction in such applications has long been recognized. Typically the position of the permanent magnet, either in a float or as a horizontally translatable position indicator, represents the position of a monitored quantity of liquid or monitored position of an object of interest.

The use of the magnetostrictive principle involves the creation of an initial current pulse within a magnetostrictive wire that interacts with the magnetic field created about the wire at the permanent magnet's location causing a torsional disturbance. Because a torsional wave is essentially an acoustic wave, its speed of propagation is sufficiently slow and measurable that a direct relationship can be established between the time it takes for the wave to travel and the distance traveled. When the end points of the wire are known and the initial start time for the torsional pulse is known, the detection of the torsional pulse at an end point of the wire will provide a time value directly related to the distance traveled by the torsional pulse. This distance is then used to determine the level of a liquid within a tank from the top to the bottom of the tank (and therefore to determine the volume of liquid remaining in the tank) or the position of a machine tool as it works an object of concern.

Use of the magnetostrictive principle in liquid level and positioning applications will typically take one of two forms. In each case, the principle involves the "interrogation" of the magnetostrictive wire with either an initial torsional pulse or an initial current pulse. In one method, a current pulse is directed through the magnetostrictive wire inducing a magnetic field around the wire. This electrically induced magnetic field interacts with the magnetic field established by the permanent magnet that is placed around the magnetostrictive wire. The interacting magnetic fields cause torsional forces that are translated into an acoustic/torsional wave in the magnetostrictive wire. Because the current pulse is essentially instantaneous (traveling at the speed of light), the start of the torsional wave can be considered as the start in time of the current pulse in the magnetostrictive wire. The torsional pulse, however, travels at the speed of sound in the wire which is much slower than the speed at which the current pulse travels and thus the time delay between the initial current pulse (the start of the torsional pulse) and the reception or detection of the torsional pulse at an end point of the magnetostrictive wire is measurable.

An alternative to the above method of utilizing the magnetostrictive principle involves imparting a torsional wave to the magnetostrictive wire, allowing it to travel down the wire to the point that it encounters the magnetic field created by the permanent magnet. The torsional motion of the wire within this magnetic field induces a current within the wire which immediately travels to the wire end points in a manner that can be detected. In either case, there is an exchange between electrical energy and mechanical energy and the appropriate detection of either electrical energy or torsional wave energy in response.

Various devices and systems that have been addressed in the past are primarily directed towards improved means for either measuring the time delay between the current pulse and the acoustic pulse or identifying and distinguishing the acoustic pulse from extraneous acoustic noise elements that occur. Much attention has been paid to various types of sensors that can accurately distinguish the particular torsional pulse of interest from other acoustic and electrically induced wave elements within the magnetostrictive wire.

Other patents and disclosures in the prior art address various means for absorbing one of the two torsional waves that travel outward from the point of interaction with the permanent magnetic field. When a current pulse is imparted to the wire, a torsional wave is initiated at the point where the wire intercepts the magnetic field of the permanent magnet and propagates in both directions along the magnetostrictive wire, although typically only one direction represents a distance that is of concern. In the opposite direction, it is generally desirable that the torsional wave be dampened and/or eliminated so that it is not finally reflected from an opposite end point of the magnetostrictive wire back to the sensor end of the magnetostrictive wire and confused with the initial wave.

The sensor that is typically at the top of or at one end of the magnetostrictive wire can be and has been described as being comprised of many different materials. Electromagnetic sensors and piezoelectric sensors have been used successfully to detect current pulse at the end point in the magnetostrictive wire and the arrival of the torsional wave, respectively.

Piezoelectric sensors have been shown to be most useful in accurately detecting and discriminating the arrival of the torsional pulse with an accuracy sufficient for many applications. In one configuration described in more detail below, two small plates of piezoelectric material, typically made up of one of a number of ceramic piezoelectric compositions, are bonded to diametrically opposed surfaces of the magnetostrictive wire. The opposite faces of these plates are then bonded to a housing or other stable mounting structure such that torsional movement of the magnetostrictive wire can be detected. FIG. 2a and 2b, described in more detail below, show two alternative prior art means for implementing conventional piezoelectric torsional wave sensors.

Piezoelectric sensors are useful in both methods of magnetostrictive application described above. The piezoelectric crystals can be stimulated by an electric current to produce a torsional wave in the magnetostrictive wire or they may be used to convert a torsional wave detected in the wire into an electric signal that is used to terminate the measured time period of concern.

The normal operational mode of piezoelectric sensors as they are utilized in such applications is in a shear mode, but certain longitudinal extensions can also be utilized. In some configurations, the piezoelectric materials are physically oriented and electrically connected so as to null certain common mode vibrations in the magnetostrictive wire, but for such nulling to be effective, the sensitivities of the two plates in both the primary axis and off axis directions must be matched closely. In addition to this, the housing to which the ends of the piezoelectric plates are attached must be either rigid or have a high inertial mass and the plates must be precisely aligned to avoid introducing false signals and undesireably enhancing an off axis vibrational response. There is, therefore, a high degree of calibration, matching, and alignment required with conventional piezoelectric elements, that is both time consuming and expensive, but necessary in order to provide a detector of sufficiently accurate character.

A number of additional problems are often encountered in the systems described in the prior art, some of which utilize piezoelectric elements and some of which do not. Many problems derive from trying to identify the point on the torsional wave that is considered to be the trigger point or the end of the time period to be measured. As indicated above, some amplification of the torsional wave caused by external factors can result in the trigger point being detected inaccurately. There is some necessity in many systems, therefore, to isolate and/or filter the torsional wave as it travels in the wire so as to allow the sensor a "cleaner" wave form for detection.

The sensitivity of a magnetostrictive wire based detector, however, is only partially related to the sensitivity of the sensor it incorporates. Much of the sensitivity and the quality of a liquid level measuring device or a position measuring device relates to the proximity of the permanent magnet to the magnetostrictive wire and the resultant magnetic coupling between the magnet and the current pulse. While sensitivity factors favor placing the permanent magnet close to, indeed surrounding the wire in many cases, accessibility and maintenance factors favor placing the sensor away from the liquid or object being measured and thus away from the permanent magnet that must be intimate to the liquid or object. The farther the permanent magnet is from the magnetostrictive wire, however, the more significant are various electromagnetic and mechanical anomalies in the system and the more difficult it is for the transducer to distinguish the torsional wave of importance from anomalies and background noise. Ideally a magnetostrictive distance or level measuring apparatus would have a combination of improvements that would together create a sensor with improved sensitivity without greatly increasing the cost of the apparatus and would permit greater emphasis on accessibility and maintenance.

It would be desirable to have a magnetostrictive wire based level or position transducer that utilizes a sensor element capable of distinguishing a specific torsional wave or current pulse, as well as a structural arrangement that allows greater mechanical isolation between the magnetostrictive wire and the magnetic position indicator. It would further be desirable to provide such a magnetostrictive wire based system that functions on a low power current source, provides easy access and maintenance, and reduces the time and expense necessary for installation and calibration.

SUMMARY OF THE INVENTION

It is, therefore, an object of the present invention to provide an improved magnetostrictive wire based position or liquid level sensor capable of accurately measuring the position of an object or other type of displacement or the level of a liquid within a storage tank.

It is another object of the present invention to provide an improved magnetostrictive wire based position transmitter that utilizes a unique piezoelectric element as a sensor in a manner that increases sensitivity and reduces the need to address spurious wave forms and acoustic noise in the magnetostrictive wire.

It is another object of the present invention to provide an improved magnetostrictive wire based position transmitter that utilizes a more sensitive and precise piezoelectric sensor element in a manner that allows the more accurate detection of the passage of a torsional acoustic wave upon which time and distant measurements are based.

It is another object of the present invention to provide an improved magnetostrictive wire based position transmitter that utilizes a unique piezoelectric element that provides better acoustic coupling between the magnetostrictive wire and the piezoelectric element.

It is another object of the present invention to provide an improved magnetostrictive wire based position transmitter that incorporates improved isolation of the magnetostrictive wire from external electromagnetic and mechanical influences, as well as improved isolation between the magnetostrictive wire and the positional permanent magnetic field.

It is a further object of the present invention to provide an improved magnetostrictive wire based position or liquid level detector that is capable of operation at a location removed from the liquid level or indicator whose position is being determined.

It is another object of the present invention to provide an improved magnetostrictive wire based position transmitter capable of operating with a low current power source.

In fulfillment of these and other objectives, the present invention provides an improved magnetostrictive wire based position transmitter that has applications in both liquid level measuring systems and in position indicating systems. A cylindrically structured and circumferentially polarized piezoelectric element directly measures a torsional acoustic wave in the magnetostrictive wire as it is received by the sensor. The sensor configuration is selectively sensitive to torsional waves while being insensitive to vibrations in alternate planes. This improved piezoelectric sensor in combination with the electrical configuration allows placement of the magnetostrictive wire apart from the liquid whose level is being measured or from the indicator whose position is of concern. The system provides a means for transmitting the liquid level to a sensor column apart from the liquid. In the preferred embodiment, each of the above improvements is provided in a system that incorporates an instrumentation loop powered microprocessor based transmitter with low current requirements and increased sensitivity.

Other objects of the present invention will become obvious to those skilled in the art upon the description of a preferred embodiment below, a description of the appended drawings, and the incorporated claims.

DETAILED DESCRIPTION OF THE PREFERRED EMBODIMENT

Figure 1:
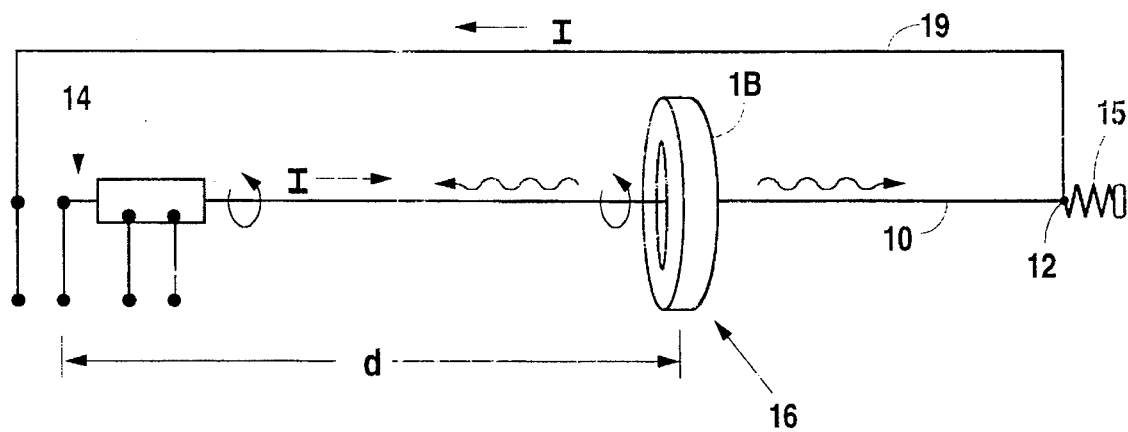
FIG. 1 is a schematic diagram showing the functional principles of the magnetostrictive effect.

Reference is first made to FIG. 1 for a brief description of the functional aspects of devices that implement the magnetostrictive effect and that are incorporated in both a portion of the prior art and in the system of the present invention. The understanding of the magnetostrictive effect and its use in conjunction with position measuring transmitters will facilitate a thorough understanding of the improvements addressed by the present invention.

THE MAGNETOSTRICTIVE EFFECT

In FIG. 1, a magnetostrictive wire (10) is shown with end points (12) and (14). The position "d" of some object to be measured is located at object point (16) somewhere between end points (12) and (14). Magnetostrictive wire (10) is an electrical conductor and is of a material that has a high magnetostrictive coefficient. At object point (16) is placed some means for imparting a permanent magnetic field. This means is typically a donut shaped permanent magnet (18) or some other type of permanent magnet (not shown) but located at or adjacent to object point (16).

Permanent magnet (18) is designed to easily move linearly along magnetostrictive wire (10) between end points (12) and (14). When utilized in a liquid level measuring system, permanent magnet (18) is typically affixed to a floating device (not shown) that allows travel vertically along magnetostrictive wire (10) that is itself directed vertically through the liquid within the tank. When utilized for a horizontal or other vertical positioning transducer, permanent magnet (18) is attached to whatever object might move along the track defined by magnetostrictive wire (10). In many cases, this is a tool of a machining device or some other component whose exact position must be readily determined.

As indicated above, use of the magnetostrictive effect in determining the position of an object is applied most commonly in one of two ways. Most often a current pulse, "I", is directed into magnetostrictive wire (10) by simply completing a circuit through return wire (19) that allows a power supply (not shown) to direct current flow therethrough. It is well known that the establishment of a current within a conductor creates a magnetic field about the conductor of a magnitude and direction related to the magnitude and direction of the current. The establishment of a magnetic field about the conductor, where previously the only magnetic field was created by permanent magnet (18), causes a torsional force to be experienced by the conductor (in this case magnetostrictive wire (10)) at the point where the magnetic fields interact (in this case object point (16)). In other words, when the magnetic field created by the current in wire (10) comes to interact with the magnetic field created by permanent magnet (18), a resultant torsional force on the magnetostrictive wire (10) occurs. This torsional force creates an acoustic wave at object point (16) in magnetostrictive wire (10) which propagates in two directions along magnetostrictive wire (10) towards each of end points (12) and (14).

It can be seen that one or both of the distances from object point (16) to either end point (12) or end point (14) could be measured and utilized to determine the position or liquid level of concern. As long as the overall length of magnetostrictive wire (10) is known, the propagation rate of the acoustic pulse within magnetostrictive wire (10) is known, and the time can be measured, then the distance from either end point (12) or (14) to object point (16) can be readily determined. Most commonly, a remote end point, (12) for example, is dampened by dampening means (15) and the acoustic wave traveling in that direction is ignored. As indicated above, most systems assume "instantaneous" creation of an acoustic pulse in magnetostrictive wire (10) upon the establishment of a current flow therethrough. The time, therefore, between the initiation of the current flow and the detection of an acoustic wave at end point (14), for example, when the propagation rate of such waves within the magnetostrictive wire (10) is known, will yield the distance "d" from end point (14) to object point (16). Given known dimensions for the system as a whole, this distance information will provide the level of liquid in a tank and therefore the volume of liquid, or will provide the position of an object with respect to some reference point.

The critical measurements, therefore, involve the trigger start of a time keeping device when the current pulse is implemented within magnetostrictive wire (10) and a second stop trigger of the time keeping device when an appropriate acoustic pulse is detected at end point (14). The detection of the acoustic pulse is, therefore, critical and is accomplished through means of some type of mechanical, electromagnetic, ultrasonic, piezoelectric, or other vibrational type transducer.

Alternate uses of the magnetostrictive effect reverse the above process, wherein instead of imparting a current to wire (10) and detecting a torsional wave, a torsional wave is imparted to wire (10) and the resultant current is detected. In this case, whatever transducer is attached to wire (10), be it piezoelectric or mechanical, a torsional wave is initiated with the transducer and the time measurement is triggered. This time traveling from an end point (14) to object point (16), the torsional wave induces a current at object point (16) when it interacts with the magnetic field established by permanent magnet (18). In this case, the physical phenomenon is simply the magnetic field interacting with the crystalline structure of the wire material in a manner that induces a current in the wire. Again, the magnitude of the current and its direction are directly related to the magnitudes and orientations of the magnetic fields.

Where the sensor is "interrogated" by use of an induced torsional wave, the time period is measured from the beginning of the wave front at an end point (14) on magnetostrictive wire (10) and is terminated when current is sensed in wire (10) as a result of the wave front's interaction with the magnetic field at permanent magnet (18). Current may be sensed in magnetostrictive wire (10) at either end point (12) or (14).

Some concern must still exist for the continued action of the wave front after it passes permanent magnet (18) because of the reflective properties of both end points (12) and (14). Gating of the time periods measured may be necessary to eliminate detection of induced currents that result from reflected or harmonic wave fronts.

EXISTING PIEZOELECTRIC SENSORS

Figure 2A:
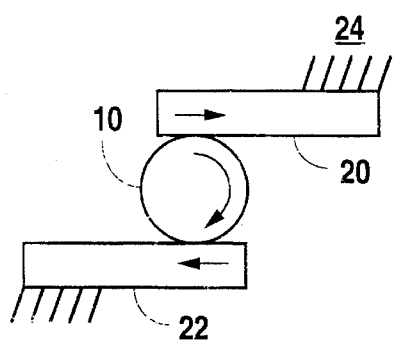
FIG. 2a is a cross sectional view of a conventional piezoelectric torsional wave detecting element.

Reference is now made to FIG. 2a for a brief description of one variation of a conventional piezoelectric torsional wave detector utilized in conjunction with the first of the above two described procedures. FIG. 2a is a detailed cross sectional view of a magnetostrictive wire and its attachment to a pair of piezoelectric plates. In this view, magnetostrictive wire (10) is seen in cross section across its diameter. Wire (10) is attached on one side to piezoelectric element (20) and on a diametrically opposite side to piezoelectric element (22). Each of these piezoelectric elements (20) and (22) is mounted respectively to structures (24) and (26). This mounting is accomplished at a face and end of piezoelectric elements (20) and (22) opposite that face and end that are attached to magnetostrictive wire (10).

Piezoelectric elements (20) and (22) are not only mounted diametrically opposite each other across magnetostrictive wire (10), but are mounted in parallel relationship such that a torsional movement in magnetostrictive wire (10) imparts opposing vibrational forces in the respective piezoelectric elements (20) and (22). Wire (10) is semi-rigidly attached to piezoelectric elements (20) and (22) at the points indicated by means of any of a number of bonding methods.

When magnetostrictive wire (10) experiences the torsional forces associated with the magnetostrictive effects described above, the torsional wave impacts piezoelectric elements (20) and (22), typically mounted at one end of magnetostrictive wire (10) (such as end point (14) in FIG. 1) and causes a vibration in each of these elements. This vibration in piezoelectric elements (20) and (22) is translated by the piezoelectric crystals into electrical behavior proportional in amplitude to the torsional wave. This electrical behavior is measurable and can provide accurate detection of the passage of the torsional wave front.

Figure 2B:
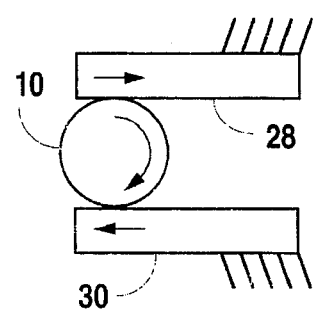
FIG. 2b is a cross sectional view of a variation of a conventional piezoelectional torsional wave detecting element.

Reference is now made to FIG. 2b for a brief description of a variation of a conventional piezoelectric torsional wave detector. Like FIG. 2a, FIG. 2b shows magnetostrictive wire (10) in detailed diametrical cross section as it might be attached to opposing parallel piezoelectric plates (28) and (30). The mounting of plates (28) and (30), as well as their attachment to magnetostrictive wire (10) are identical to those shown in FIG. 2a except that piezoelectric plate (30) is not only in parallel relationship to plate (28), but is oriented in a mirror matched fashion. This imparts opposite mechanical forces on each of piezoelectric plates (28) and (30) which is simply accounted for in the electronic detection circuitry associated with the system. The functional principles, however, of such an arrangement are identical to the principles applied in FIG. 2a.

THE IMPROVED EMBODIMENT

Figure 3:
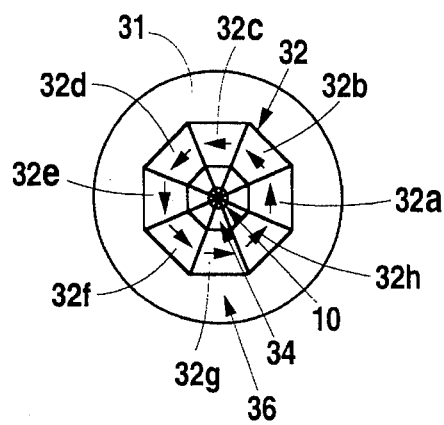
FIG. 3 is a cross sectional view of the cylindrical piezoelectric element of the present invention.

Reference is now made to FIG. 3 for a detailed description of the improved piezoelectric sensor element of the present invention. As the parallel plate piezoelectric element structure described with respect to FIGS. 2a and 2b has a number of significant drawbacks related to its inability to distinguish spurious wave forms and background noise from the acoustic wave front of concern, an improved means for discriminating such signals is desirable. The piezoelectric element structure shown in FIG. 3 accomplishes most of these improvements.

A novel piezoelectric element configuration is a shear tube element that is essentially a hollow cylinder polarized in a particular manner to make it sensitive to the shearing forces between an inner and outer cylindrical surface. Piezoelectric elements in general are typically polarized in a manner that optimizes their output when forces are exerted in a particular direction across the crystalline structure. With respect to FIGS. 2a and 2b, the polarization of the piezoelectric elements is such that the torsional movement of the magnetostrictive wire (as shown) creates an optimal output based upon the orientation of the piezoelectric plates. The cylindrical, circumferentially polarized, piezoelectric element (32) of FIG. 3 contacts aluminum cylinder (34) or other low mass metallic cylinder circumferentially at nearly every point on its external surface. Circumferential polarization greatly improves the piezoelectric element's detection capabilities and, as will be described in more detail below, allows the sensor to discriminate between the torsional wave front of interest and other spurious noise wave forms and anomalies.

Cylindrical piezoelectric element (32) utilized in the preferred embodiment is actually comprised of a plurality of separate, interconnected piezoelectric segments (32a–h), each polarized in the directions indicated in the figure. Since a circular polarization would be theoretically impossible to construct within a one piece cylindrical piezoelectric element, the sensor must be constructed from a number of cylindrically arranged wedge shaped elements that are each polarized and stacked one next to another to create what approaches a cylindrical, circumferentially polarized element. Each of these elements or segments is polarized from its first positive face to its second negative face, wherein a positive face of the first element is placed adjacent to a negative face of a second element when the cylindrical piezoelectric element is assembled from these individual wedge shaped elements. Individual segments (32a–h) could be of any number, although in the preferred embodiment described with respect to FIG. 3 they include a total of eight segments polarized in the circumferential direction. As with other piezoelectric element sensors, sensor (32) shown in FIG. 3 must be bonded through standard techniques to an internal and an external structure.

The magnetostrictive wire (10) is bonded to the interior face of aluminum cylinder (34) through conductive epoxy. This low mass metallic cylinder (34) is similarly bonded along its exterior face to the interior surface of piezoelectric element (32). A brass cylinder or other high mass metallic cylinder (36) encompasses the piezoelectric element (32), rigidly positioned with respect to the torsional wave in the magnetostrictive wire (10).

Figure 3A:
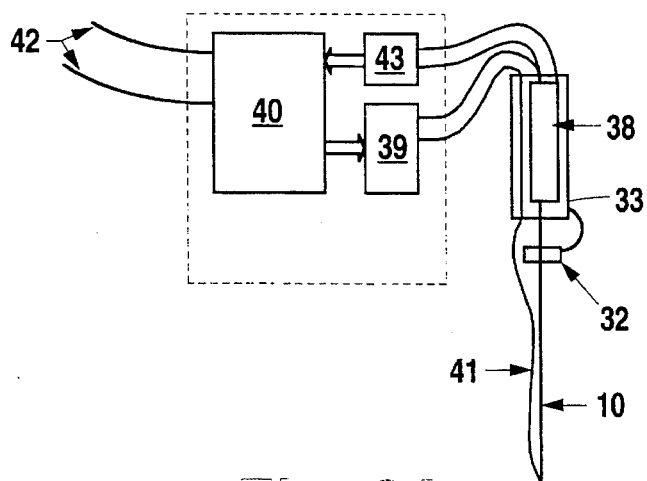
FIG. 3A is a block diagram of the primary components of the improved liquid level or position transmitter.

Referring to FIG. 3A, the primary components of the transmitter (44) are shown in block diagram form. Initially, pulsing circuit (39) sends a current pulse to magnetostrictive wire (10) with return wire (41) completing the circuit. The aluminum cylinder (34) (not shown) and brass cylinder (36) (not shown) establish an electrical connection between the piezoelectric element (32) and the amplifier circuit (38) such that the voltage across the piezoelectric element (32) is amplified and processed through the microprocessor (40) after the level comparator circuit (43) compares levels between the start and end pulses, the microprocessor (40) controlling the output current in the instrumentation current loop (42). The transmitter output signal in the preferred embodiment ranges from 4 milliamps to 20 milliamps, although alternatively, any instrumentation current loop may serve as a power supply.

Returning to FIG. 3, the electrical output of sensors (32a–h) would be measured from the top end (33) (see FIG. 3A) of magnetostrictive wire (10) and the external surface of the high mass metallic cylinder (36). The torsion of magnetostrictive wire (10) would produce an electrical output and the off axis vibrations which affected the conventional configuration would produce no output from the shear tube piezoelectric structure.

The principal advantages of this shear tube piezoelectric structure, therefore, in this particular application are; 1) its very low sensitivity to longitudinal and transverse vibrations, 2) its sensitivity to torsional vibrations, 3) the nulling, which is inherent in this shear tube configuration, of off axis vibration, 4) the matching and precise alignment required in conventional configurations is not as critical in this structure since they are irrelevant to the detection of a torsional wave front, and finally 5) undesirable effects of the mounting mechanism and housing structure are minimized because the piezoelectric element is of singular construction without variations across mounting points, either with magnetostrictive wire (10) or mounting frame work.

Piezoelectric sensor (31) would be mounted at an end point of magnetostrictive wire (10) and would serve to function primarily as a means for detecting the occurrence of a torsional wave front at that end point. Just as easily, however, piezoelectric element (32) could be utilized to impart a torsional wave to magnetostrictive wire (10) with detection of a current flow in the magnetostrictive wire.

Figure 4:
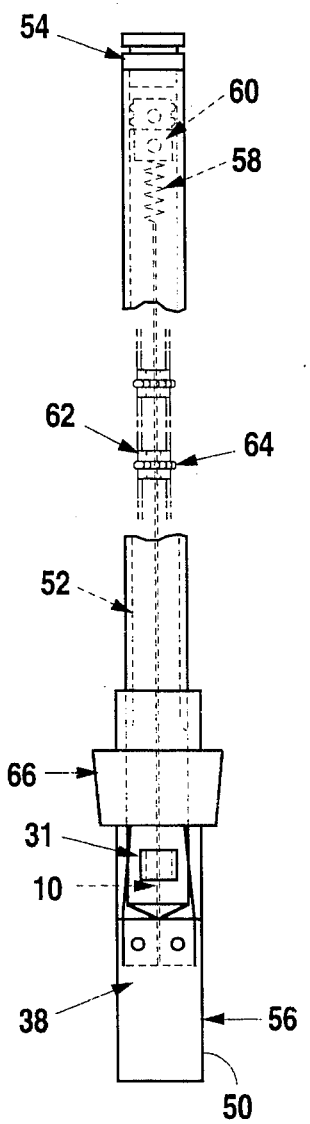
FIG. 4 is a partial cut away side view of the sensor tube of the present invention.

Reference is now made to FIG. 4 for a detailed description of a typical use of the improved piezoelectric sensor element described above. FIG. 4 discloses a unitary sensor tube (50) that incorporates all of the necessary components for the incorporation of a magnetostrictive wire within either a liquid level transducer or a position transducer. Sensor tube (50) is an elongated cylindrical structure composed primarily of tube (52) and end pieces (54) and (56). The primary functional component of sensor tube (50) is magnetostrictive wire (10) that passes from end piece (54) through tube (52) to finally terminate at end piece (56). End piece (54) is welded to tube (52) and in the preferred embodiment is sealed. Magnetostrictive wire (10) is attached to end piece (54) by way of spring (58) which is itself connected to PC board (60) which functions to complete the loop circuit for imparting the current flow in magnetostrictive wire (10) (also shown in FIG. 3A), Magnetostrictive wire (10) may be held in a central position within tube (52) through the use of grommets (62) and "O" rings (64) placed at various intervals along tube (52) separating magnetostrictive wire (10) from an internal face of tube (52).

Tube (52) is welded to sensor holder (66) in a manner that closes off the external face of tube (52) from the sensor elements described below, Within sensor holder (66), magnetostrictive wire (10) is terminated in a manner similar to the termination at end piece (54) so as to ensure the ability to create a current flow in wire (10) for induction of a torsional wave front, Amplifier board (38) is shown as it would be positioned in sensor holder (66) to both terminate magnetostrictive wire (10) and to provide the circuitry necessary for amplifying the detected pulse.

Piezoelectric sensor element (31) is shown in its position surrounding magnetostrictive wire (10) and close to an end point of magnetostrictive wire (10) within piezoelectric sensor holder (66). Electrical connections (not shown) are made between piezoelectric sensor (31) and circuit board (38) for external connection to signal circuitry associated with the sensor.

Figure 5:
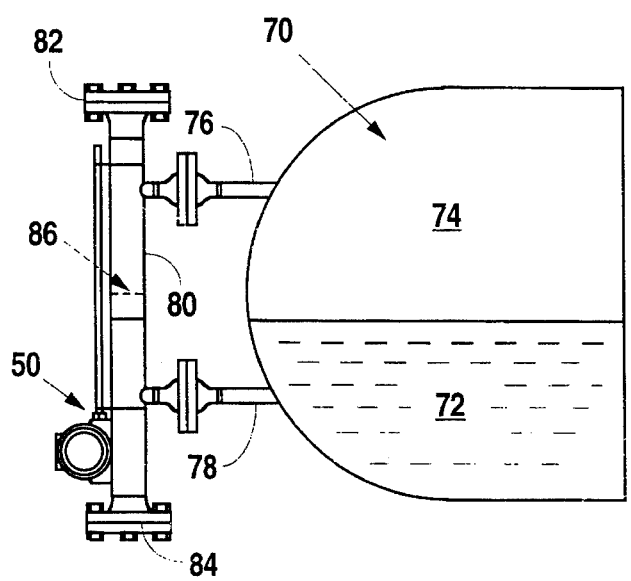
FIG. 5 is a partial cut away side view of a typical application of the present invention utilized in conjunction with the measurement of a liquid level within a container.

Reference is now made to FIG. 5 for a detailed description of one specific application of the improvements described by the present invention. FIG. 5 shows a partial cross sectional side view of a typical liquid storage tank and the means for incorporating the sensor system of the present invention therein. Tank (70) contains process liquid (72) of some type and gaseous space (74) above liquid (72). Typically, a volume of tank (70) is correlated to a measure of the level of liquid (72) within tank (70).

In this particular application, the sensor structure of the present invention is conveniently positioned adjacent rather than within tank (70) by means of liquid level conductors (76) and (78). The structure shown carries the liquid level of tank (70) to a remote location attached to the external surface of tank (70) for ease of application of the sensor of the present invention. Conductors (76) and (78) are attached to cylindrical housing (80) which is a vertically oriented cylindrical tube that will retain a liquid level indicative of the liquid level within tank (70). Cylindrical tube (80) is sealed at the top (82) and bottom (84).

Within tube (80) and shown by dotted line indication, is magnetic float (86). Contrary to prior art structures, magnetic float (86) need not be of a toroidal shape, but may in fact be of any configuration appropriate for creating and isolating a magnetic field along the linear track that changes in the liquid level might take. Sensor tube (50) of the present invention is attached not within cylindrical tube (80), but to the exterior of cylindrical tube (80) and thus in no way comes in contact with the process liquid (72) being measured. The sensitivity of the improved piezoelectric sensor elements and the improved structural elements of sensor (50) allow for accurate measurements to be made without the necessity of strong coupling to the magnetic field, as might be accomplished with a toroidal permanent magnet surrounding the magnetostrictive wire. In this case, the improved sensitivity of this sensor is sufficient that permanent magnet (86) contained within cylindrical tube (80) is close enough to sensor tube (50) to provide the necessary electromechanical interaction to impart a torsional wave to magnetostrictive wire (not shown) that can be accurately detected.

Reference is now made to an alternative means (not shown) for applying the sensor tube of the present invention. As in FIG. 5, tank (70) again contains process liquid (72) and air space (74). In this application, however, sensor tube (50) is placed directly into liquid (72) and a more conventional toroidal permanent magnet configuration is implemented. Sensor tube (50) is again contained within cylindrical tube (80) so as to partially isolate the structure of the present invention from the containment tank (70) and any effects that external forces might have. While there is no requirement that magnetic float (86) be toroidal in nature or to surround magnetostrictive wire (10) within sensor tube (50), such configuration does simplify the structure necessary for permanent magnet (86) to be retained in a position adjacent to sensor tube (50). Again, in this alternative embodiment, the liquid level of process liquid (72) is translated to the internal space of cylindrical tube (80) by conduits (76) and (78) as shown in FIG. 5 and is thus imparted to the position of magnetic float (86) along the linear track defined by sensor tube (50). The method and manner in which the magnetostrictive effect creates a torsional wave in the magnetostrictive wire is identical to that of the first embodiment described.

Overall, the improvements described by the present invention allow for structural configurations heretofore not possible because of limitations on sensitivity and accuracy. The cylindrical, circumferentially polarized, piezoelectric element eliminates the need to define and distinguish anomalous wave forms typically sensed by conventional piezoelectric structures. This allows the sensor to detect more minute torsional wave occurrences within the magnetostrictive wire and thus to permit a structure wherein the permanent magnet is less directly coupled in both physical space and magnetic coupling to the magnetostrictive wire. The configurations described above would be difficult to achieve with sensor structures of a conventional nature whose sensitivity and discrimination are of lower quality. This greater sensitivity allows for a more convenient positioning of the sensor and transducer elements and a greater isolation of these elements from the process liquids or process structures that are being measured.

Not only would other applications of the present sensor be anticipated by the above description, but other applications of the described transducer could be contemplated as well. Apart from liquid level measuring transducers, position transducers could be constructed wherein the horizontal or vertical movement of a machine tool along a particular linear track could be measured. The permanent magnet structure described above as a floating means in each of the embodiments could be some other permanent structure attached to the object whose motion and position are of concern.

A somewhat more complex mechanism for coupling the magnetic field of the permanent magnet to the sensor tube described might be necessary with these alternative applications, but, overall, the complexity of the sensor tube itself need not be greater. As long as a permanent magnet is positionable and is free to move along the track defined by the magnetostrictive wire, an accurate determination of the position of the permanent magnet and, therefore, of the object of concern can be made.

I claim:

1. A circumferentially closed cylindrical piezoelectric element for sensing a torsional force comprising:

a plurality of separate, interconnected piezoelectric segments each of said segments being a radial segment of said cylindrical piezoelectric element, each of said segments being polarized from a first positive face to a second negative face thereof, wherein a positive face of a first of said segments is placed adjacent to a negative face of a second of said segments when said cylindrical piezoelectric element is assembled from said segments so as to establish a circumferential polarization in said element, said interconnected segments forming an inner circumference and an outer circumference; and a means coupled to said inner circumference and said outer circumference for electrically applying and measuring said torsional force between said inner circumference said outer circumference.

2. A circumferentially closed cylindrical piezoelectric element for sensing a torsional force comprising:

a plurality of separate, interconnected piezoelectric segments, each of said segments being a radial segment of said cylindrical piezoelectric element, each of said segments being polarized from a first positive face to a second negative face thereof, wherein a positive face of a first of said segments is placed adjacent to a negative face of a second of said segments when said cylindrical piezoelectric element is assembled from said segments so as to establish a circumferential polarization in said element, said interconnected segments forming an inner circumference and an outer circumference;

a means coupled to said inner circumference and said outer circumference for electrically applying and measuring said torsional force between said inner circumference and said outer circumferences;

a magnetostrictive wire having an outside diameter;

a first low mass metallic cylinder encompassing a first end of said magnetostrictive wire, said first cylinder having an inside diameter approximately equal to said outside diameter of said magnetostrictive wire and an outside diameter approximately equal to said inside diameter of said interconnected segments, said outside diameter of said magnetostrictive wire bonded to said inside diameter of said first cylinder and said outside diameter of said low mass metallic cylinder bonded to said inside diameter of said interconnected segments; and a second high mass metallic cylinder encompassing said interconnected segments, said second cylinder having an inside diameter approximately equal to said outside diameter of said interconnected segments, said second metallic cylinder being rigidly positioned with respect to a torsional wave in said magnetostrictive wire.

3. The cylindrical piezoelectric element of claim 2 wherein said first low mass metallic cylinder and said second high mass metallic cylinder are electrically coupled to an amplifier circuit, said first low mass metallic cylinder electrically coupled to said amplifier circuit through said magnetostrictive wire and said second high mass metallic cylinder electrically coupled to said amplifier circuit through a surface of said second high mass metallic cylinder, an electrical output of said interconnected segments measured from said first end of said magnetostrictive wire and said surface of said second high mass metallic cylinder, said low mass metallic cylinder and said high mass metallic cylinder establishing electrical connection for an interior face and an exterior face of said piezoelectric element.

4. An improved magnetostrictive wire based position transmitter for liquid level measuring systems and object position indicators, the improved transmitter comprising:

a magnetostrictive wire, said wire having first and second fixed ends and having a length;

a circumferentially closed cylindrical piezoelectric element for sensing a torsional force wherein said cylindrical piezoelectric element comprises a plurality of piezoelectric segments, each of said segments being a radial segment of said cylindrical piezoelectric element, each of said segments being polarized from a first positive face to a second negative face thereof, wherein a positive face of a first of said segments is placed adjacent to a negative face of a second of said segments when said element is assembled from said segments, said element having a circumferential polarization and being acoustically coupled to said first end of said magnetostrictive wire;

a permanent magnet, said magnet movable along said length of said magnetostrictive wire, said permanent magnet being indicative of said liquid level or of said object position; and means for imparting an electric current in said magnetostrictive wire;

wherein said electric current in said wire causes a torsional wave in said wire upon interaction with a magnetic field about said permanent magnet, said torsional wave detectable with said circumferentially polarized, cylindrical piezoelectric element.

5. The improved transmitter of claim 4 wherein said wire and said element are positioned apart from said permanent magnet and said liquid or said object whose position or level is being measured, and said transmitter further comprises:

means for holding said magnetostrictive wire and said piezoelectric element;

means for communicating said liquid level or said object position to a location remote from said liquid or said object, said remote position being adjacent said means for holding said wire and said element; and means for positioning said permanent magnet at said remote location such that said magnet is indicative of said liquid level or said object position and is magnetically coupled to said wire, but is physically isolated from said wire and said element;

wherein said remote location provides improved accessibility to said transmitter for installation and maintenance of said transmitter.

6. The improved transmitter of claim 4 wherein said piezoelectric element senses the passage of said torsional wave through said first end of said wire generating a voltage, said voltage amplified and then processed by a microprocessor, said microprocessor controlling an output current in an instrumentation current loop.

7. The improved transmitter of claim 4 wherein said yielded output current of said instrumental current loop having a magnitude in the range from 4 milliamps to 20 milliamps.

8. The improved transmitter of claim 5 wherein:

said means for holding said magnetostrictive wire and said piezoelectric element comprises a sensor tube having first and second ends, said first end of said sensor tube holding said first end of said magnetostrictive wire and said piezoelectric element;

said means for communicating said liquid level or said object position to a location remote from said liquid or said object comprises first and second conduits between said liquid or said object and said means for positioning said permanent magnet; and said means for positioning said permanent magnet comprises an indicator tube, said indicator tube communicating with said first and second conduits and positioned generally parallel to and in magnetic coupling to said sensor tube.

9. An improved magnetostrictive wire based position transmitter for liquid level measuring systems and object position indicators, the improved transmitter comprising:

a magnetostrictive wire, said wire having first and second fixed ends and having a length;

a circumferentially closed cylindrical piezoelectric element for sensing a torsional force wherein said cylindrical piezoelectric element comprises a plurality of piezoelectric segments, each of said segments being a radial segment of said cylindrical piezoelectric element, each of said segments being polarized from a first positive face to a second negative face thereof, wherein a positive face of a first of said segments is placed adjacent to a negative face of a second of said segments when said element is assembled from said segments, said element having a circumferential polarization and being acoustically coupled to said first end of said magnetostrictive wire, said element further comprising:

a first low mass metallic cylinder encompassing said first end of said magnetostrictive wire, said first cylinder having an inside diameter approximately equal to an outside diameter of said magnetostrictive wire and an outside diameter approximately equal to an inside diameter of said piezoelectric element; and a second high mass metallic cylinder encompassing said piezoelectric element, said second cylinder having an inside diameter approximately equal to an outside diameter of said piezoelectric element, said second metallic cylinder being rigidly positioned with respect to said torsional wave in said magnetostrictive wire;

a permanent magnet, said magnet movable along said length of said magnetostrictive wire, said permanent magnet being indicative of said liquid level or of said object position; and means for imparting an electric current in said magnetostrictive wire;

wherein said electric current in said wire causes a torsional wave in said wire upon interaction with a magnetic field about said permanent magnet, said torsional wave detectable with said circumferentially polarized, cylindrical piezoelectric element.

10. The improved transmitter of claim 9 wherein said first low mass metallic cylinder and said second high mass metallic cylinder are electrically coupled to an amplifier circuit, said first low mass metallic cylinder electrically coupled to said amplifier circuit through said magnetostrictive wire and said second high mass metallic cylinder electrically coupled to said amplifier circuit through a surface of said second high mass metallic cylinder, an electrical output of said piezoelectric segments measured from said first end of said magnetostrictive wire and said surface of said second high mass metallic cylinder, said low mass metallic cylinder and said high mass metallic cylinder establishing electrical connection for an interior face and an exterior face of said piezoelectric element.

* * * * *